US008620602B2

(12) United States Patent
Alonso

(10) Patent No.: US 8,620,602 B2
(45) Date of Patent: Dec. 31, 2013

(54) SYSTEM FOR DETECTING LEAKS IN SINGLE PHASE AND MULTIPHASE FLUID TRANSPORT PIPELINES

(75) Inventor: Julio Roberto Alonso, Sao paulo (BR)

(73) Assignee: Asel-Tech Technologia E Automacao Ltda. (BR)

( * ) Notice: Subject to any disclaimer, the term of this patent is extended or adjusted under 35 U.S.C. 154(b) by 323 days.

(21) Appl. No.: 12/680,225

(22) PCT Filed: Sep. 23, 2008

(86) PCT No.: PCT/BR2008/000291
§ 371 (c)(1),
(2), (4) Date: Mar. 26, 2010

(87) PCT Pub. No.: WO2009/067770
PCT Pub. Date: Jun. 4, 2009

(65) Prior Publication Data

US 2010/0312502 A1 Dec. 9, 2010

(30) Foreign Application Priority Data

Nov. 30, 2007 (BR) ..................................... 0705710

(51) Int. Cl.
*G01F 17/00* (2006.01)

(52) U.S. Cl.
USPC ............................................................ 702/52

(58) Field of Classification Search
USPC ............................................................ 702/51
See application file for complete search history.

(56) References Cited

U.S. PATENT DOCUMENTS 5,272,646 A * 12/1993 Farmer ............................ 702/51
5,517,537 A * 5/1996 Greene et al. ................. 376/252

* cited by examiner

*Primary Examiner* — Stephen Cherry
(74) *Attorney, Agent, or Firm* — Galbreath Law Offices, P.C.; John A. Galbreath

(57) ABSTRACT

This patents refers to a system developed for detecting leaks in single-phase and multiphase fluid transport pipelines characterized by use measurements cells (3), sensors (4), locals processors (5) and neural models, where the measuring sensors (4) and the measurement cells (3) are installed at a number of locations along the pipeline with the purpose of monitoring the characteristic leak and normal operational pipeline transient waveforms. The local processors (5) are responsible for obtaining and sampling the signals supplied by the sensors (4), as well as their pre-processing, to make them compatible with the inputs to the neural model, this are associated to dynamic memory banks for analyzing the signals supplied by the sensors with the aim of emitting an alarm in the event that waveforms with the characteristics of a leak are detected. The local processors (5) are necessaries to implement and execute the neural models and, in the event that a leak is detected, carry out the localization calculations based on the different propagation velocities of the fluid dynamic transient caused by the leak. The system use of a communications network for transmitting data between the local processors with the aim of comparing the alarms originating from the local processors (5).

6 Claims, 3 Drawing Sheets

Figure 1:
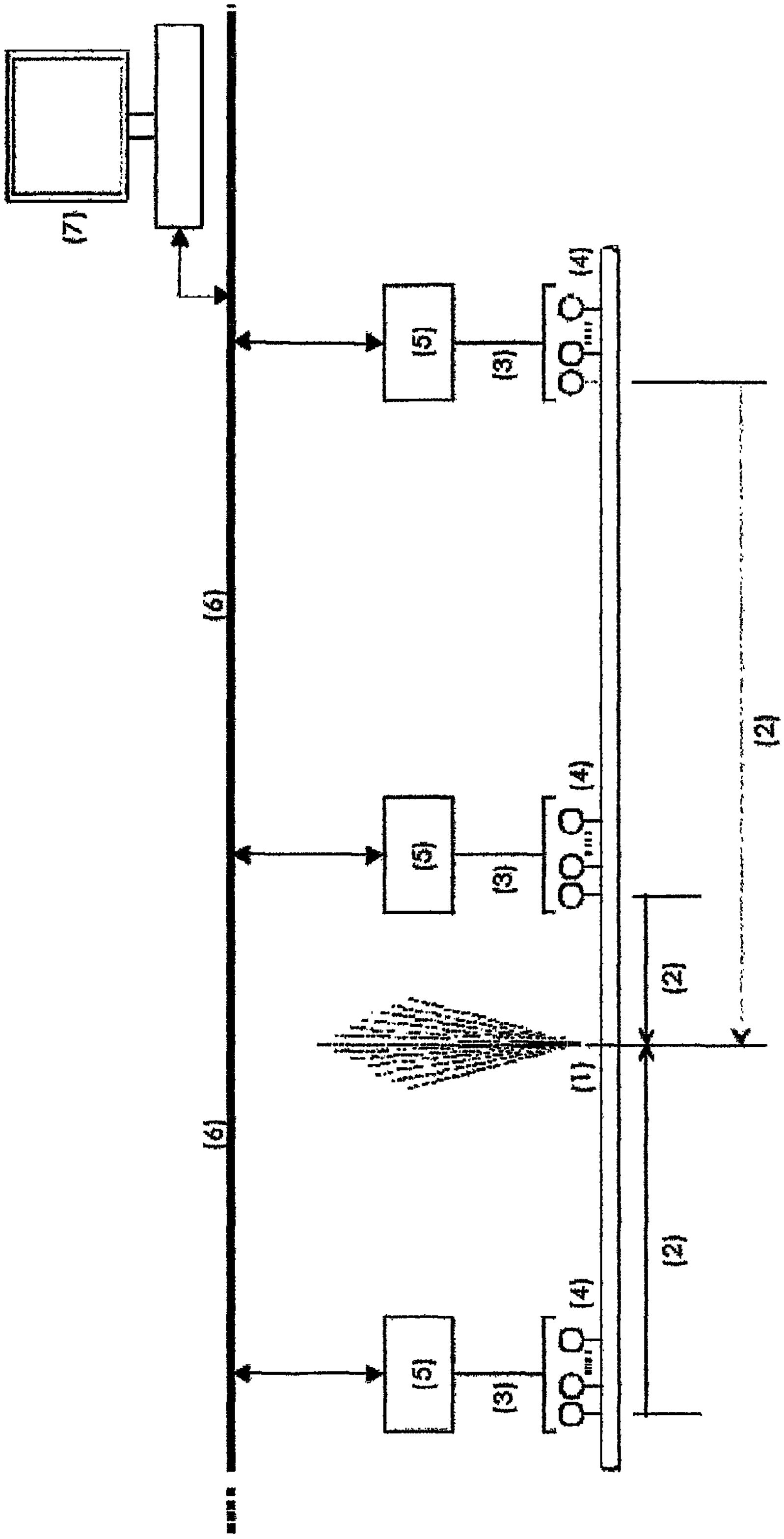

SYSTEM FOR DETECTING LEAKS IN SINGLE PHASE AND MULTIPHASE FLUID TRANSPORT PIPELINES

1. PRELIMINARY CONSIDERATIONS

Pipelines are widely used for the transport of fluids, both for industrial applications over long distances and for distribution systems when a given fluid must be delivered to a large number of users or processes via a pipeline network.

In both cases, for a safe and efficient operation, it is necessary to detect and quickly eliminate any accidental or deliberate leaks, especially when the fluid being transported is toxic and/or inflammable.

This need is absolutely clear in view of the large number of accidents that have repeatedly occurred, usually with important economic and environmental consequences.

The main causes of accidents in oil and gas pipelines are linked to corrosion, mechanical and operational failures, ground movements, natural phenomens and external actions, which may or may not be deliberate or illegal connections, for example.

These problems are particularly serious in any country of the world for two basic reasons:

- the aging of the pipeline system associated with the installation of the Brazilian oil industry dating from the 1960s, and
- the considerable expansion of the sector brought about by internal and external investments, the flexibilization of monopolies and privatizations.

2. BACKGROUND OF THE INVENTION

From a technical point of view, the detection of pipeline leaks may be considered to be a technology that is still being developed because of the extremely significant limitations associated with the current commercially available technologies.

By the way, we must said that detection systems based on mass balance do not apply to pipelines transporting gases and especially to multiphase fluid transporting pipelines due to the intrinsic lack of accuracy of the physical models associated with these types of flow.

On the other hand, detection based on acoustic wave sensing fails or gives unsatisfactory results when the ends of the pipeline are connected to devices that influence acoustic propagation, or which generate signals that are similar to a leak.

This is, for example, the case when a valve is opened, where the fluid dynamic transient is similar to that of a leak, or the case of a pipeline that discharges into a buffer reservoir, which has the effect of canceling out the acoustic pressure wave.

In general terms, the technologies available nowadays are based on mechanistic models, where the operational state of the system is continuously compared to a model.

Non-mechanistic alternatives include the injection of chemical tracers, the analysis of acoustic emissions and pressure waves, visual inspection, the analysis of thermal variations associated with leaks and the emission of radio or radar waves by probes (pigs) introduced into the pipeline. In spite of their relative diffusion, these solutions are often unsatisfactory, either because of their high operational complexity, false alarms, failure to signal an alarm etc. or because of their high intrinsic costs.

3. TECHNOLOGICAL ADVANCE

This invention is not subjected to this type of restriction because it is based on an artificial intelligence model which can be adjusted to each specific situation. Furthermore, this invention monitors a set of physical variables, and not only the acoustic pressure as is the case with earlier inventions. Consequently, the probability of a false alarm is virtually zero, because the dynamic signature of a leak is unique when represented by a set of physical variables.

4. BRIEF DESCRIPTION OF DRAWINGS

In order to obtain a complete visualization of the makeup of this System For Detecting Leaks In Single Phase And Multiphase Fluid Transport Pipelines, the followings drawings shows how the system works:

FIG. 1: Shows the diagram of the system and how works the measurement cells.

Figure 2:
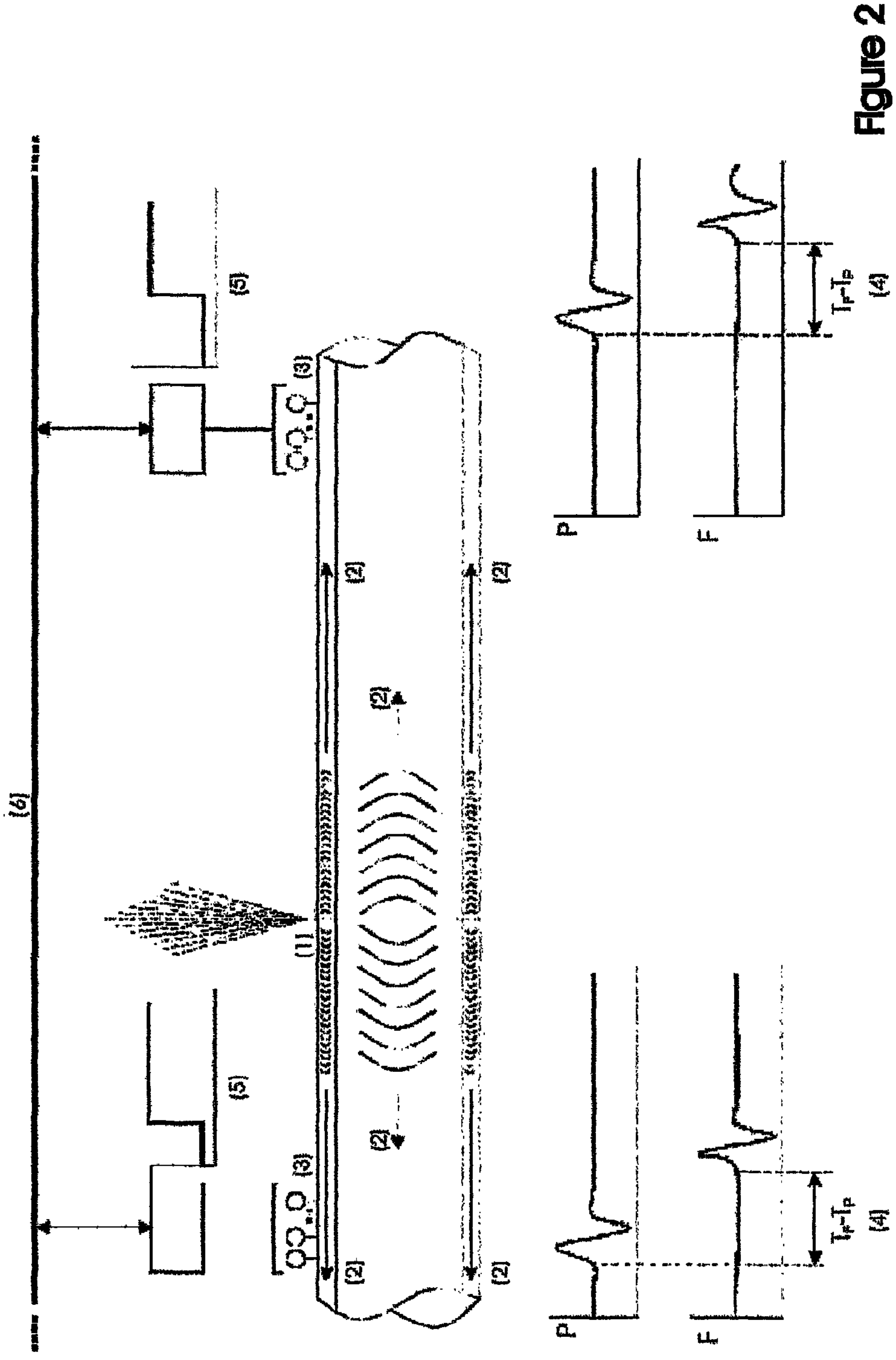

FIG. 2: Represents an squemathical view of the characteristic leakage signals through the fluid medium and through the walls or structure of the pipeline FIG. 3: Shows a neural model used to detect the different ways of a leak.

5. DESCRIPTION OF THE INVENTION

This invention involves a system that is capable of detecting the appearance of a leak in a fluid transport system (1) and determines its location (2).

This system, shown in the diagram in FIG. 1, consists of measurement cells (3) made up of sets of sensors (4) responsible for monitoring the physical variables used to describe the flow, local processors (5) responsible for acquiring and processing the signals provided by the measurement cells and issuing alarms when leaks are detected, a communications system network (6) between the local processors and the microcomputer (7) for viewing the operational state of the pipeline via a Human Man Interface (HMI), external communications via ethernet, etc.

The original nature of this invention lies in its operating principal: the fluid dynamic transient caused by a leak (1) has its own signature when a number of physical variables such as: flow pressure, throughput, velocity, acceleration, specific deformity etc., are recorded (8).

Detection is by local processors containing an artificial intelligence model which has been adjusted in advance to recognize this signature, as well as to discriminate normal operating conditions such as the closing of a valve or the switching on a pump.

These artificial intelligence models consist of computer instructions executed at the local processors (5). In turn, these computer instructions are programmed in such a way that they depend on numerical parameters that may be configured so that the performance of the detection system may be optimally adjusted.

The configuration procedure for these parameters is carried out based on recording the signatures of different normal operating situations, as well as leakage tests carried out in an intentional, controlled way. These data are supplied to the artificial intelligence model and its internal and external parameterization is altered iteratively so that the performance is optimized, i.e.: alarms are emitted when there are leaks, and transients arising under normal operating conditions do not produce leakage alarms (false alarms).

The leak is located by each of the local processors, based on the different propagation velocities of the characteristic leakage signals through the fluid medium and through the walls or structure of the pipeline, as shown in FIG. 2.

Therefore, let L be the position of the leak (1), let Vf and Vp be the propagation velocities (2) in the fluid and the walls respectively, and let Tf and Tp be the respective times taken for the transients to reach the measuring cell (3), then under these conditions, the position of the leak can be determined by the local processor using the formula:

$$L=(Tf-Tp)VpVp-VfVf$$

It is important to highlight that only the difference between Tf and Tp (4) can be determined by the local processor, since the exact instant when the pipeline ruptured and created the leak is not known.

The output variable from the artificial intelligence model (5) changes state whenever the signature of a leak is identified, triggering the localization procedure in accordance with the strategy defined in the paragraph above. As soon as the leak is confirmed, it must, for example, have occurred inside the local processor monitoring zone amongst other constraints, an alarm is emitted through the communications network (6) which is picked up by the other processors as well as by the microcomputer containing the HMI. Certainty and Location Accuracy Indices are attributed to the leak as it is detected by different local processors and as a function of the discrepancies between the positions transmitted by each one of them.

One important characteristic of this invention refers to the possibility of improving the accuracy of leak localization at each local processor, based on the fact that the fluid dynamic transient caused by the leak can propagate through other mediums as well as the fluid and the walls of the pipeline. Common examples include the structure that supports the pipelines and the ground itself where the capacity to conduct low-frequency elastic waves is quite significant.

Figure 3:
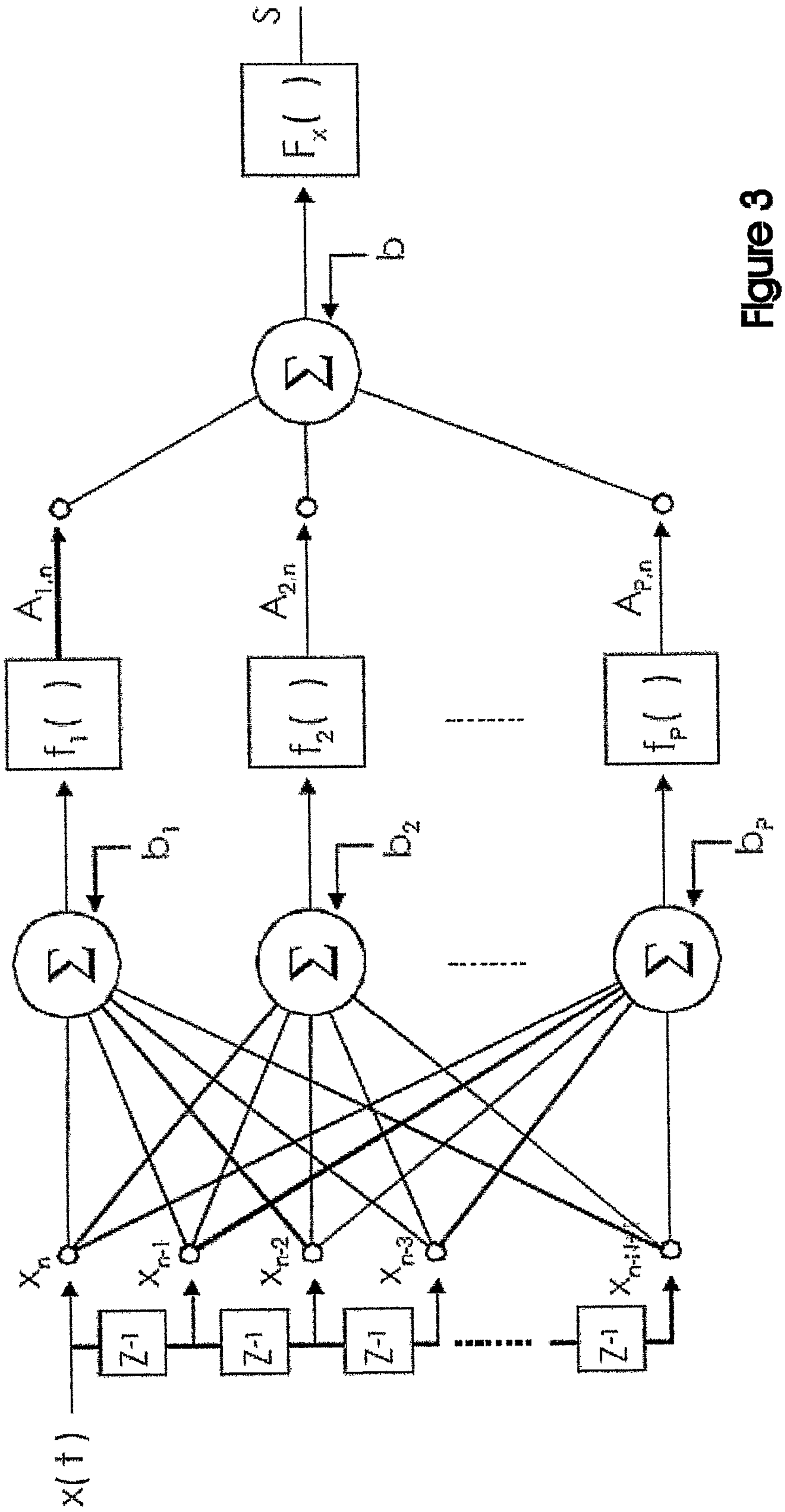

The artificial intelligence model installed at the local processors corresponds to a neural network or a connectionist network preceded by a set of dynamic memories which are responsible for recording the history of the flow monitoring variables, as shown in FIG. 3.

It is important to point out that each sensor in a measurement cell supplies a signal which is analyzed by a specific neural network and is adjusted independently. Therefore, let x(t) be the signal supplied by one of these sensors and $x_n=x(t-n\Delta t)$, a sequence of values sampled at intervals given by $\Delta t$ by the local processor, it can be seen in FIG. 3 that the history of x(t) is stored in N memory positions, i.e. n=0, 1, . . . N−1, which represents an analysis horizon given by $T=N\Delta t$.

These values are the input stimuli for the next layer of neurons, where each of these is responsible for the identification of a specific waveform associated with the leak or with a normal operational pipeline transient.

Mathematically, a neuron is a so-called activation function which will change state if the waveform that is associated with it is identified. Therefore, let $f_i(\ )=A_i$, the activation function of the $i^{th}$ neuron in the input layer (FIG. 3), let $W_{i,n}$ be the synaptic weights responsible for the coupling of the stimulus and the neuron in focus, and let $b_i$ be the bias (stimulus displacement parameter). Under these conditions, the output state of the $i^{th}$ neuron can be calculated using the following expression:

$$N-1$$

$$A_i=f_i(\Sigma W_{i,n}X_n+b_i)$$

$$n=0,1$$

Several activation functions can be used for the purpose of waveform detection, depending on the neural network training algorithm to be used during the system adjustment stage.

For example, sigmoid logistic functions can be used if the training is carried out by back propagation, since this algorithm requires differentiable activation functions.

One important characteristic of the neural model is that the outputs from the first neuron layer can be classified into two groups, depending on whether the neurons are specialized in identifying the waveform that is characteristic of the leak (reinforcing outputs) or in identifying normal operational pipeline transients (inhibiting outputs).

Mathematically, this can be accomplished by training the reinforcing neurons to produce positive outputs in the event of activation and training the inhibiting neurons to produce negative outputs in the event of activation. Thus, the set of outputs $\{A_i\}$ can be analyzed using one or more subsequent neuron layers, which are responsible for emitting the alarm or not through a single leak-indicating output state. In the case where there is a single subsequent layer, consisting of a single analysis neuron. Its activation function is given by $F_x(\ )$. The subscript x denotes the measuring cell sensor that the neural model is associated to, and its synaptic weights and bias are denoted by $P_k$, k=0,1, . . . M−1, and b respectively. Thus the output, $S_x$, of the neural model is calculated as:

$$M-1$$

$$S_x=F_x(\Sigma P_k A_k+b)$$

$$k=0,1$$

The output neuron activation function, $F_x(\ )$ can equally well be chosen from out of the different functions normally used for this purpose (sigmoid logistic, tangential hyperbolic and purelin amongst others). One interesting alternative involves adopting the binary function given by:

$$Fx=u\{0\ se\ u<0\}$$

$$\{0se\ u>0\}$$

since, in this case, the precision of the arrival times of the characteristic waveforms of the fluid dynamic transient, caused by the rupture in the pipeline are maximized, and consequently the leak can be located with greater accuracy.

6. CONCLUSION

As the relate described and illustrated the System For Detecting Leaks In Single Phase And Multiphase Fluid Transport Pipeline, fills a significant gap that exists in the market and, for the reasons set forth and as a consequence of this, its merits the respective privilege.

The invention claimed is:

1. A system for detecting a leak in a single phase or multiphase fluid transport pipeline, comprising:
- measurement cells;
- sensors adapted to mount directly on the pipeline in which leaks are intended to be detected;
- local processors;
- and neural models adapted to identify the low frequency components of the hydraulic transients or transient waveforms, below 3Hz, that are characteristic of a leak in the pipeline, differentiating them from the signals generated under normal pipeline operation.

2. The system for detecting a leak in a single phase or multiphase fluid transport pipeline of claim 1, wherein the sensors and the measurement cells are mounted directly on the pipeline at a plurality of locations, several kilometers far apart, in order to monitor the transient waveforms, that are characteristic of a leak in the pipeline, as well as normal pipeline operation signals.

3. The system for detecting a leak in a single phase or multiphase fluid transport pipeline of claim 1, wherein the local processors are adapted to obtain and sample signals supplied by the sensors, and are adapted to pre-process the signals supplied by the sensors, in order to make the signals compatible with inputs to the neural models.

4. The system for detecting a leak in a single phase or multiphase fluid transport pipeline of claim 1, wherein the neural models are associated with dynamic memory banks that are adapted to analyze signals supplied by the sensors, and wherein the system emits an alarm when the system detects transient waveforms that have the characteristics of a leak.

5. The system for detecting a leak in a single phase or multiphase fluid transport pipeline of claim 1, wherein the local processors are adapted to implement and execute the neural models and, when a leak is detected, are adapted to carry out leak location calculations based on different propagation velocities of a transient waveform caused by the leak.

6. The system for detecting a leak in a single phase or multiphase fluid transport pipeline of claim 1, wherein the system also comprises a communications network that transmits data between the local processors in order to compare alarms originating from the local processors, and obtains a more accurate leak location by using a weighted average of positions calculated by each of the local processors.

* * * * *